3,032,585
PROCESS FOR THE PRODUCTION OF p-BIS-(2-CHLOROETHYL)-AMINOPHENYLALANINE
Franz Bergel and John Albert Stock, London, England, assignors to National Research Development Corporation, London, England, a corporation of Great Britain
No Drawing. Filed Nov. 30, 1955, Ser. No. 550,214
Claims priority, application Great Britain Dec. 3, 1954
10 Claims. (Cl. 260—518)

This invention relates to chemotherapeutic agents and is concerned with an improvement in or modification of the invention of United States application Ser. No. 415,964.

The said United States application Ser. No. 415,964 describes the compound p-bis-(2-chloroethyl)-aminophenylalanine and includes not only the racemic or DL form but also the D and L forms. The specification describes processes for the manufacture of the compound, including a process for the manufacture of the L form starting from L-phenylalanine and the D form starting from D-phenylalanine. The specification further states that the L form has greater tumour growth inhibiting action than either the D form or the racemic form.

It has now been found that the D and L forms of p-bis-(2-chloroethyl)-aminophenylalanine can be obtained starting from optically inactive materials by the resolution of certain intermediates as hereinafter described.

Accordingly, the present invention provides a process for the production of L-p-bis-(2-chloroethyl)-aminophenylalanine which comprises treating a solution of N-acetyl-p-nitro-DL-phenylalanine with brucine, separating the optical isomers by crystallisation of the brucine salt of the L-isomer, preferably from ethanol, basifying a solution of the brucine salt of the L-isomer to precipitate brucine, removing the brucine, acidifying the solution to produce N-acetyl-p-nitro-L-phenylalanine, subjecting this compound to hydrolysis to produce L-p-nitrophenylalanine, esterifying the carboxyl group of this compound, reacting the ester with phthalic anhydride to form the N-phthaloyl derivative, subjecting this to catalytic hydrogenation to reduce the nitro group to a namino group, treating the amino compound with ethylene oxide to effect hydroxyethylation, and then subjecting the product to chlorination with phosphorus oxychloride or thionyl chloride followed by hydrolysis for the removal of the phthaloyl group to produce L-p-bis-(2-chloroethyl)-aminophenylalanine.

The corresponding D-compound can be produced in a similar manner by isolating the brucine salt of the D-isomer from the mother liquor from which the brucine salt of N-acetyl-p-nitro-L-phenylalanine crystallises, basifying a solution of the brucine salt obtained, removing the brucine which precipitates and acidifying the solution to produce N-acetyl-p-nitro-D-phenylalanine which is then treated as described above for N-acetyl-p-nitro-L-phenylalanine.

The present invention also includes a process for the production of L-p-bis-(2-chloroethyl)-aminophenlalanine which comprises treating a solution of p-nitro-N-phthaloyl-DL-phenylalanine with cinchonidine, separating the optical isomers by precipitation of the cinchonidine salt of the D-isomer, preferably from methanol, basifying a solution of the cinchonidine salt of the L-isomer to precipitate cinchonidine, removing the cinchonidine, acidifying the solution to produce p-nitro-N-phthaloyl-L-phenylalanine, esterifying this compound to produce an ester of p-nitro-N-phthaloyl-L-phenylalanine, preferably the ethyl ester, subjecting this to catalytic hydrogenation to reduce the nitro group to an amino group, treating the amino compound with ethylene oxide to effect hydroxyethylation, and then subjecting the product to chlorination with phosphorus oxychloride or thionyl chloride followed by hydrolysis for the removal of the phthaloyl group to produce L-p-bis-(2-chloroethyl)-aminophenylalanine.

The corresponding D compound can be produced in a similar manner by treating the cinchonidine salt of the D-isomer of p-nitro-N-phthaloyl-phenylalanine.

p-Nitro-N-phthaloyl-DL-phenylalanine can be produced by condensing p-nitrobenzoyl chloride and diethyl phthalimindomalonic ester in methyl ethyl ketone in the presence of sodium iodide, hydrolysing the resulting crystalline p-nitrobenzylphthalimido-malonate by Albertson's method to give N-(o'-carboxybenzoyl)-p-nitro-DL-phenylalanine and subjecting this compound to ring closure with acetic anhydride to give p-nitro-N-phthaloyl-DL-phenylalanine.

The following examples illustrate the invention:

(1) Diethyl α-acetamido-α-p-nitrobenzylmalonate (50 g.) was refluxed for 24 hrs. with a solution of sodium carbonate (50 g.) in water (500 ml.) (cf. Albertson, J. Amer. Chem. Soc., 1950, 72, 1396). To the mechanically-stirred hot filtered solution was slowly added concentrated hydrochloric acid (110 ml.). Solid separated, the solution frothed vigorously and its temperature rose. The mixture was boiled with stirring for a few minutes, cooled and left in the ice-box overnight. The pale brown crystalline product (28 g.; 78%) was filtered off and had M.P. 205–209° C. Recrystallisation from water (charcoal) gave colourless needles of N-acetyl-p-nitro-DL-phenylalanine, M.P. 207–209° C. (Found: C, 52.7; H, 5.0; N, 10.7. $C_{11}H_{12}O_5N_2$ requires C, 52.4; H, 4.8; N, 11.1%.)

To a solution of the DL acid (23.55 g.) in hot ethanol (200 mil.) was added a solution of brucine (36.9 g.; 1.00 mol.) in hot ethanol (200 ml.), and the mixture left overnight at room temperature. Pale yellow prisms were deposited. The mixture was cooled in ice-water for an hour, and the product, M.P. 203-–208° C. (25.35 g.; 84%) filtered off. Recrystallisation from ethanol gave pale yellow prisms of the brucine salt of N-acetyl-p-nitro-L-phenylalanine, M.P. 207–209.5° C., and $[\alpha]_D^{21}$ +19.2°±0.5° (c., 1.59 in 1:1 $H_2O$ dioxan). Recrystallisation did not significantly affect the rotation or M.P. (Found: C, 61.1; H, 5.85; N, 8.6. $C_{34}H_{38}O_9N_4 \cdot H_2O$ requires C, 61.0; H, 6.0; N, 8.4%.) (Found (after drying at 100° C. and 1 mm. pressure for 4 hours): C, 62.7; H, 6.2; N, 8.6. $C_{34}H_{38}O_9N_4$ requires C, 63.1; H, 5.9; N, 8.7%.)

Treatment of an aqueous solution of the salt with ammonia or sodium hydroxide, removal of the brucine by filtration, acidification of the filtrate, and recrystallisation of the product from water yielded colourless prisms of N-acetyl-p-nitro-L-phenylalanine, initial M.P. 170–172° C., resolidification, final M.P. 206–209° C., $[\alpha]_D^{24}$ +49.7°±1° (c., 1.55 in EtOH). (Found: C, 52.5; H, 4.8; N, 11.0. $C_{11}H_{12}O_5N_2$ requires C, 52.4; H, 4.8; N, 11.1%.)

The ethanolic mother liquors from the brucine salt separation were evaporated to dryness under vacuum, and the residual gum was taken up in hot water. Crystallisation set in on cooling slightly. After an hour at ice temperature, the product (36.95 g.) was collected and recrystallised from water, yielding yellow prisms of the brucine salt pentahydrate of N-acetyl-p-nitro-D-phenylalanine, M.P. 98–99° C., $[\alpha]_D^{21}$ −36.9°±0.5° (c., 1.63 in 1:1 $H_2O$ dioxan). Recrystallisation raised the $[\alpha]_D^{21}$ to −37.6±0.5° (c., 1.60). (Found (on sample dried in a vacuum desiccated over $H_2SO_4$): C, 55.3; H, 6.6; N, 7.9. $C_{34}H_{38}O_9N_4 \cdot 5H_2O$ requires C, 55.4; H, 6.6; N, 7.6%.) (Found (on sample dried to constant weight at 80° C. in a high vacuum): C, 62.8; H, 5.65; N, 9.0. $C_{34}H_{38}O_9N_4$ requires C, 63.1; H, 5.9; N, 8.7%.) Treatment of an aqueous solution of the salt in water with aqueous ammonia, removal of the precipitated brucine, acidification with hydrochloric acid and recrystallisation of the product from water gave colourless prisms of N-acetyl-p-nitro-D-phenylalanine, initial M.P. 170–172° C., resolidification, final M.P. 205–206° C., $[\alpha]_D^{23}$ −44°±0.5° (c., 1.45 in EtOH). (Found: C, 52.3; H, 4.8; N, 11.2.)

N-acetyl-p-nitro-L-phenylalanine (70 mg.) from the brucine separation was esterified in the cold with 2 N ethanolic hydrogen chloride (2 days at room temperature). Evaporation of the solvent gave a colourless gum which recrystallised from water in tiny colourless needles (90%) of the ethyl ester of N-acetyl-p-nitro-L-phenylalanine, M.P. 115–117° C., $[\alpha]_D^{19}$ +13.0°±0.5° (c., 1.33 in EtOH).

In order to show that this compound belonged to the L series p-nitro-L-phenylalanine ethyl ester hydrochloride (2.0 g.) was prepared from L-phenylalanine (Bergel and Stock, J.C.S., 1954, 2409) and acetylated in 75% yield by heating for 10 min. with acetic anhydride-potassium carbonate. Crystallisation of the product from water gave colourless needles of the L-acetyl compound, M.P. 115–117° C., $[\alpha]_D^{19}$ +13.5°±0.5° (c., 1.32 in EtOH). (Found: C, 55.9; H, 5.8; N, 10.2. $C_{13}H_{16}O_5N_2$ requires C, 55.7; H, 5.75; N, 10.0%.) When this reference compound was mixed with the compound obtained as described above the melting point was unchanged.

The D ester was obtained similarly in comparable yield from the D acid ($[\alpha]_D^{20}$ −43°±1° (c., 1.5 in EtOH)). Recrystallisation from water gave a product of M.P. 116–118° C., $[\alpha]_D^{22}$ −11.0°±1.0° (c., 1.58 in EtOH). (Found, C, 55.9; H, 5.5; N, 9.9.)

N-acetyl-p-nitro-L-phenylalanine (0.5 g.: $[\alpha]_D^{24}$ +50°) was refluxed for 2.5 hours with 6 N hydrochloric acid (10 ml.). The solution was evaporated to dryness (vacuum), the crystalline residue evaporated with ethanol (vacuum) and then refluxed 1.5 hours with 2 N ethanolic hydrogen chloride (8 ml.). Evaporation of the solvent and crystallisation of the residue from acetone-methanol gave the p-nitro-L-phenylalanine ethyl ester hydrochloride (0.440 g.), M.P. 203–205° C. (decomp.), unchanged on admixture with the L compound, M.P. 204–205° C. (decomp.) prepared from p-nitro-L-phenylalanine (Bergel and Stock, loc. cit.), $[\alpha]_D^{20}$ +11.7°±0.5° (c., 2.3 in $H_2O$).

This compound was then converted to p-bis-(2-chloroethyl)-amino-L-phenylalanine as described in Example 3 of United States application Ser. No. 415,964.

(2) Diethyl sodium phthalimidomalonate (Barger and Weichselbaum, Organic Syntheses, 1943, Coll. Vol. II, 384) (6.52 g.) was dissolved in boiling methyl ethyl ketone (80 ml.) and a solution of p-nitrobenzyl chloride (3.44 g.; 1.0 mol.) in the same solvent (20 ml.) was added. Sodium iodide (ca. 0.5 g.) dissolved in hot methyl ethyl ketone (10 ml.) was introduced, and produced an immediate precipitation. The mixture was refluxed for 1.5 hours, cooled, filtered, evaporated under vacuum and the residual gum crystallised from ethanol. The diethyl-p-nitrobenzyl-phthalimidomalonate formed colourless prisms (88%), M.P. 103–105° C., sharpening to 104–105° C. on recrystallising from ethanol. (Found: C, 59.8; H, 4.5; N, 6.4. $C_{22}H_{20}O_8N_2$ requires C, 60.0; H, 4.6; N, 6.4%.)

Diethyl-p-nitrobenzyl-phthalimidomalonate (70 g.) and sodium carbonate (70 g.) in water (700 ml.) were refluxed overnight with mechanical stirring (to avoid bumping). The clear brown solution was acidified with hydrochloric acid and refluxing and stirring were continued for a further 40 minutes. The mixture was cooled and the colourless precipitate (31 g.) collected. A second crop (18.5 g.) was obtained on evaporation of the mother liquors. Crystallisation from aqueous ethanol gave the compound N-carboxybenzoyl-p-nitro-DL-phenylalanine as small needles, M.P. 198–200° C. (Found (on sample dried at 100° C. in high vacuum): C, 56.8; H, 4.1; N, 7.8. $C_{17}H_{14}O_7N_2$ requires C, 57.0; H, 3.9; N, 7.8%.)

The N-carboxybenzoyl compound (2.7 g.) was refluxed for 30 minutes with acetic anhydride (10 ml.), the mixture taken to dryness (vacuum) and the residue heated with water. The cooled gummy product became granular on rubbing and crystallised from methyl ethyl ketone-petrol or aqueous ethanol in almost colourless needles, M.P. 184–186° C., of p-nitro-N-phthaloyl-DL-phenylalanine.

A solution of p-nitro-N-phthaloyl-DL-phenylalanine (1.0 g.) in methanol (25 ml.) and a solution of cinchonidine (0.865 g.; 1.00 mol.) in methanol (30 ml.) were mixed. Crystallisation soon set in. The mixture was left overnight, and the colourless needles (0.97 g.), M.P. 209–210° C., collected. After two recrystallisations from methanol the cinchonidine salt of the D-acid had M.P. 211° C. and $[\alpha]_D^{21}$ +82°±1.0° (c., 0.84 in dioxan). (Found (after drying at 100° C. in high vacuum): C, 67.0; H, 5.8; N, 8.8. $C_{36}H_{34}O_7N_4 \cdot MeOH$ requires C, 66.7; H, 5.7; N, 8.4%.)

To the salt (2.9 g.) in warm ethanol (50 ml.) was added water (50 ml.) and a slight excess (ca. 10 ml.) of N aqueous sodium hydroxide. The mixture was diluted with water, cooled, filtered from the precipitated base and the filtrate acidified with hydrochloric acid. The tiny needles of p-nitro-N-phthaloyl-D-phenylalanine (1.05 g.) had, after recrystallisation from ethanol, M.P. 207–208° C., $[\alpha]_D^{20}$ +240°±2° (c., 1.01 in EtOH). (Found: C, 60.1; H, 3.7; N, 8.2. $C_{17}H_{12}O_6N_2$ requires C, 60.0; H, 3.55; N, 8.2%.) Refluxing with 2 N ethanolic hydrogen chloride yielded p-nitro-N-phthaloyl-D-phenylalanine ethyl ester, M.P. 82–83° C., $[\alpha]_D^{20}$ +206°±1.0°.

Evaporation of the mother liquors from the original cinchonidine experiment gave a gum which crystallised readily from aqueous ethanol in almost colourless needles (0.73 g.), M.P. 191–192.5° C. Two recrystallisations from aqueous ethanol gave the cinchonidine salt of the L-acid, M.P. 192.5–194° C., $[\alpha]_D^{20}$ −170°±1.0° (c., 1.32 in EtOH). (Found after drying at 100° C. in high vacuum): C, 66.2; H, 5.6; N, 8.6. $C_{36}H_{34}O_7N_4 \cdot H_2O$ requires C, 66.3; H, 5.5; N, 8.6%.)

The acid was isolated as for the D-isomer. The recrystallised p-nitro-N-phthaloyl-L-phenylalanine had M.P. 209–211° C., $[\alpha]_D^{21}$ −233°±2°. (Found, C, 60.3; H, 3.8; N, 8.4%.)

Conversion to the L ethyl ester gave, after two crystallisations, a product of M.P. 84–85° C. (unchanged on admixture with an authentic specimen of the same M.P.) and $[\alpha]_D^{20}$ −212°±2°.

The p-nitro-N-phthaloyl-D-phenylalanine ethyl ester and the p-nitro-N-phthaloyl-L-phenylalanine ethyl ester were converted respectively to D-p-bis-(2-chloroethyl)-aminophenylalanine and L-p-bis-(2-chloroethyl)-aminophenylalanine as described in Examples 3 and 4 of United States application Ser. No. 415,964.

What we claim is:

1. A process for the production of L-p-bis-(2-chloroethyl)-aminophenylalanine which comprises treating a solution of N-acetyl-p-nitro-DL-phenylalanine with brucine, separating the optical isomers by crystallisation of the brucine salt of the L-isomer, basifying a solution of the brucine salt of the L-isomer to precipitate brucine, removing the brucine, acidifying the solution to produce N-acetyl-p-nitro-L-phenylalanine, subjecting this compound to hydrolysis to produce L-p-nitrophenylalanine, esterifying the carboxyl group of this compound, reacting the ester with phthalic anhydride to form the N-phthaloyl derivative, subjecting this to catalytic hydrogenation to reduce the nitro group to an amino group, treating the amino compound with ethylene oxide to effect hydroxyethylation, and then subjecting the product to chlorination with a chlorinating agent selected from the group consisting of phosphorus oxychloride and thionyl chloride followed by hydrolysis for the removal of the phthaloyl group to produce L-p-bis-(2-chloroethyl)-aminophenylalanine.

2. A process according to claim 1 wherein the brucine salt of the L-isomer is crystallised from ethanol.

3. A process for the production of D-p-bis-(2-chloroethyl)-aminophenylalanine which comprises treating a solution of N-acetyl-p-nitro-DL-phenylalanine with brucine, separating the optical isomers by crystallisation of the brucine salt of the L-isomer, isolating the brucine salt of the D-isomer from the mother liquor from which the brucine salt of N-acetyl-p-nitro-L-phenylalanine crystallises, basifying a solution of the brucine salt obtained, removing the brucine which precipitates, acidifying the solution to produce N-acetyl-p-nitro-D-phenylalanine, subjecting this compound to hydrolysis to produce D-p-nitrophenylalanine, esterifying the carboxyl group of this compound, reacting the ester with phthalic anhydride to form the N-phthaloyl derivative, subjecting this to catalytic hydrogenation to reduce the nitro group to an amino group, treating the amino compound with ethylene oxide to effect hydroxyethylation and then subjecting the product to chlorination with a chlorinating agent selected from the group consisting of phosphorus oxychloride and thionyl chloride followed by hydrolysis for the removal of the phthaloyl group to produce D-p-bis-(2-chloroethyl)-aminophenylalanine.

4. A process according to claim 3 wherein the brucine salt of the L-isomer is crystallised from ethanol.

5. A process for the production of L-p-bis-(2-chloroethyl)-aminophenylalanine which comprises treating a solution of p-nitro-N-phthaloyl-DL-phenylalanine with cinchonidine, separating the optical isomers by precipitation of the cinchonidine salt of the D-isomer, basifying a solution of the cinchonidine salt of the L-isomer to precipitate cinchonidine, removing the cinchonidine, acidifying the solution to produce p - nitro - N - phthaloyl-L-phenylalanine, esterifying this compound to produce an ester of p-nitro-N-phthaloyl-L-phenylalanine, subjecting this to catalytic hydrogenation to reduce the nitro group to an amino group, treating the amino compound with ethylene oxide to effect hydroxyethylation, and then subjecting the product to chlorination with a chlorinating agent selected from the group consisting of phosphorus oxychloride and thionyl chloride followed by hydrolysis for the removal of the phthaloyl group to produce L-p-bis-(2-chloroethyl)-aminophenylalanine.

6. A process according to claim 5 wherein the cinchonidine salt of the D-isomer is precipitated by methanol.

7. A process according to claim 5 wherein the ester is the ethyl ester.

8. A process for the production of D-p-bis-(2-chloroethyl)-aminophenylalanine which comprises treating a solution of p-nitro-N-phthaloyl-DL-phenylalanine with cinchonidine, separating the optical isomers by precipitation of the cinchonidine salt of the D-isomer, basifying a solution of the cinchonidine salt of the D-isomer to precipitate cinchonidine, removing the cinchonidine, acidifying the solution to produce p - nitro - N - phthaloyl - D-phenylalanine, esterifying this compound to produce an ester of p-nitro-N-phthaloyl-D-phenylalanine, subjecting this to catalytic hydrogenation to reduce the nitro group to an amino group, treating the amino compound with ethylene oxide to effect hydroxyethylation and then subjecting the product to chlorination with a chlorinating agent selected from the group consisting of phosphorus oxychloride and thionyl chloride followed by hydrolysis for the removal of the phthaloyl group to produce D-p-bis-(2-chloroethyl)-aminophenylalanine.

9. A process according to claim 8 wherein the cinchonidine salt of the D-isomer is precipitated by methanol.

10. A process according to claim 8 wherein the ester is the ethyl ester.

References Cited in the file of this patent

Geschickter: J.A.M.A. 94, pp. 326–328 (1930).
J.A.M.A. 94, pp. 1845 and 1864–1865 (1930).
Kaplan: Am. J. Cancer, p. 210, 13 January (1932).
Fieser et al.: Organic Chemistry, 2 Ed., pp. 148, 267–269, 441, 634, 699.
McClellan: Ind. and Eng. Chem. 42 pp. 2405–2406 (1950).